(12) United States Patent
Sankrithi

(10) Patent No.: US 11,427,322 B2
(45) Date of Patent: Aug. 30, 2022

(54) GALLEY CART STOWAGE SYSTEM FOR A GALLEY OF AN AIRCRAFT

(71) Applicant: The Boeing Company, Chicago, IL (US)

(72) Inventor: Mithra M. K. V. Sankrithi, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 16/670,086

(22) Filed: Oct. 31, 2019

(65) Prior Publication Data
US 2021/0129992 A1    May 6, 2021

(51) Int. Cl.
*B64D 11/00* (2006.01)
*B64D 11/04* (2006.01)

(52) U.S. Cl.
CPC .......... *B64D 11/0007* (2013.01); *B64D 11/04* (2013.01)

(58) Field of Classification Search
CPC .............................. B64D 11/0007; B64D 11/04
See application file for complete search history.

(56) References Cited

U.S. PATENT DOCUMENTS

| | | | | |
|---|---|---|---|---|
| 3,517,899 A | * | 6/1970 | Vernon | B30B 9/3021 186/40 |
| RE32,176 E | * | 6/1986 | Vernon | B64D 11/04 186/40 |
| 4,660,787 A | * | 4/1987 | Sprenger | B64D 11/0007 186/47 |
| 5,159,994 A | * | 11/1992 | Luria | B64D 11/04 186/40 |
| 6,305,643 B1 | | 10/2001 | Sankrithi | |
| 9,284,054 B2 | * | 3/2016 | Saint-Jalmes | B64D 11/00 |
| 2005/0133308 A1 | * | 6/2005 | Reysa | B64D 11/04 186/40 |
| 2005/0218265 A1 | * | 10/2005 | Harrington | B64D 11/04 244/118.5 |
| 2005/0230540 A1 | * | 10/2005 | Harrington | B64D 11/04 244/118.2 |
| 2006/0186268 A1 | * | 8/2006 | Harrington | B64D 11/04 244/118.5 |
| 2012/0325960 A1 | * | 12/2012 | Saint-Jalmes | B64D 11/00 414/277 |
| 2016/0311534 A1 | * | 10/2016 | Nojiri | B64D 11/04 |

FOREIGN PATENT DOCUMENTS

| WO | 2005066022 A2 | 7/2005 | |
|---|---|---|---|
| WO | WO-2005066022 A2 * | 7/2005 | ......... B64D 11/0007 |

* cited by examiner

*Primary Examiner* — Philip J Bonzell
(74) *Attorney, Agent, or Firm* — The Small Patent Law Group LLC; Jay J. Hoette

(57) ABSTRACT

A galley cart stowage system includes lower and upper cart compartments defining lower and upper galley cart cavities receiving the galley carts. The lower galley cart cavity is defined by walls and the upper galley cart cavity is defined by walls. A vertical conveyance device extends between the lower and upper cart compartments to move galley carts therebetween. A galley workspace has a countertop and a workspace volume located above the lower cart compartment and located below the upper cart compartment.

26 Claims, 6 Drawing Sheets

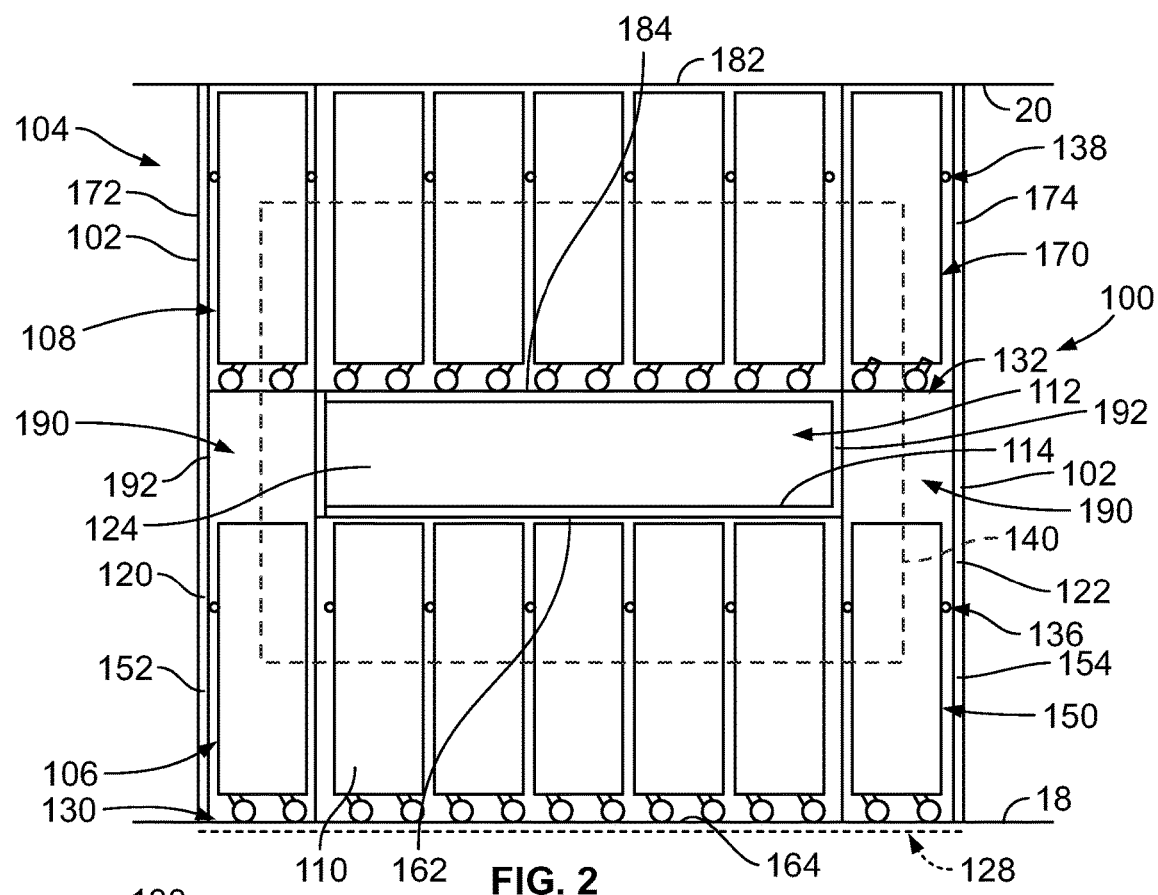
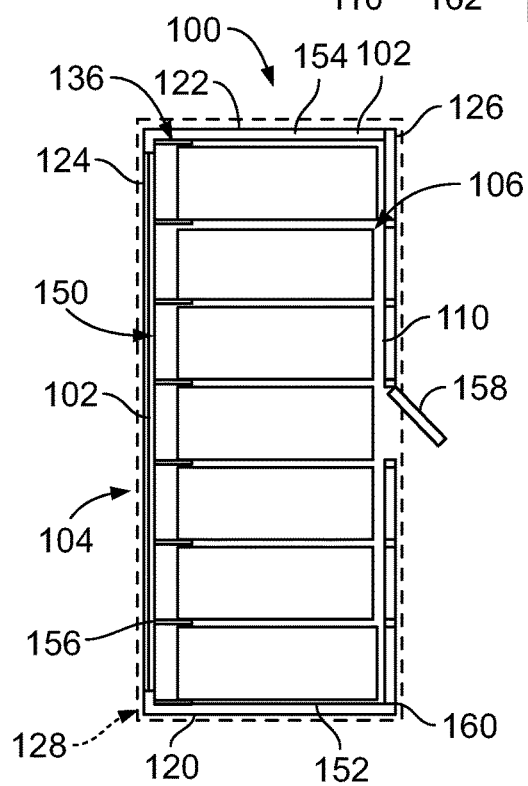 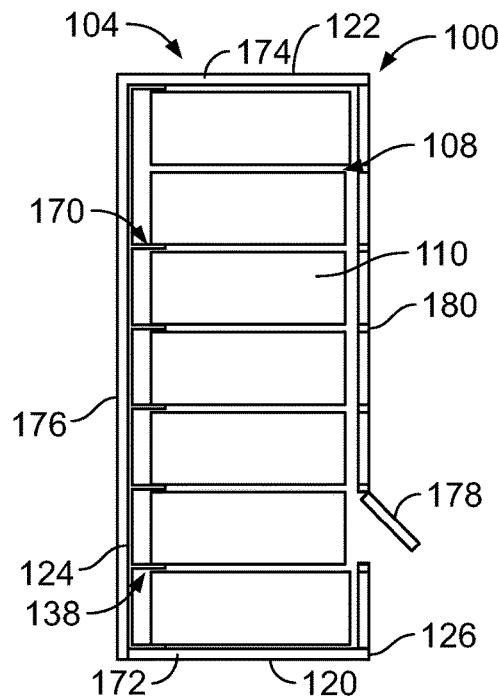
FIG. 2
FIG. 3
FIG. 4

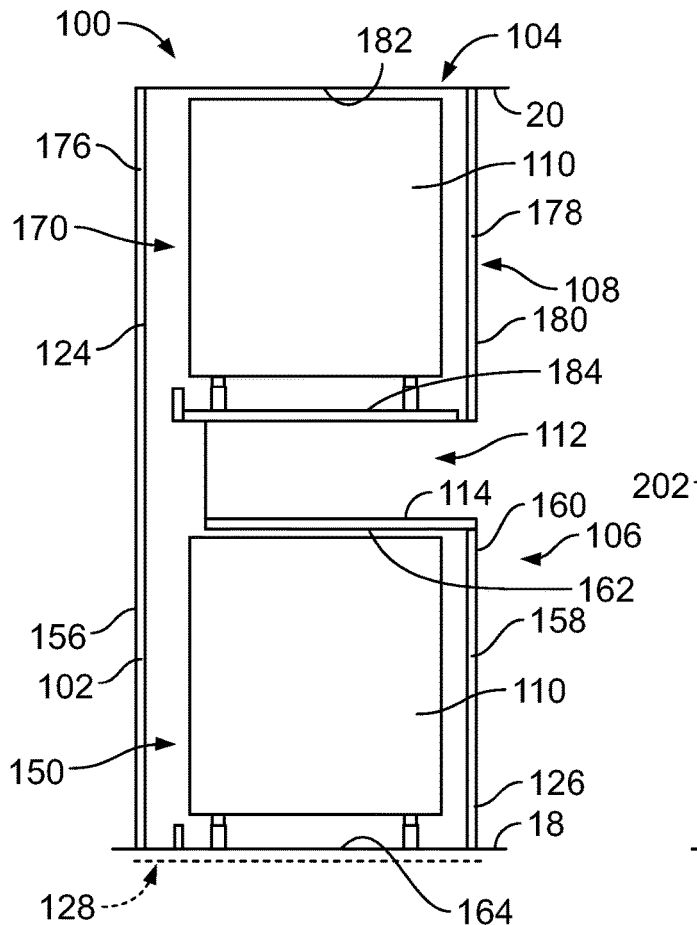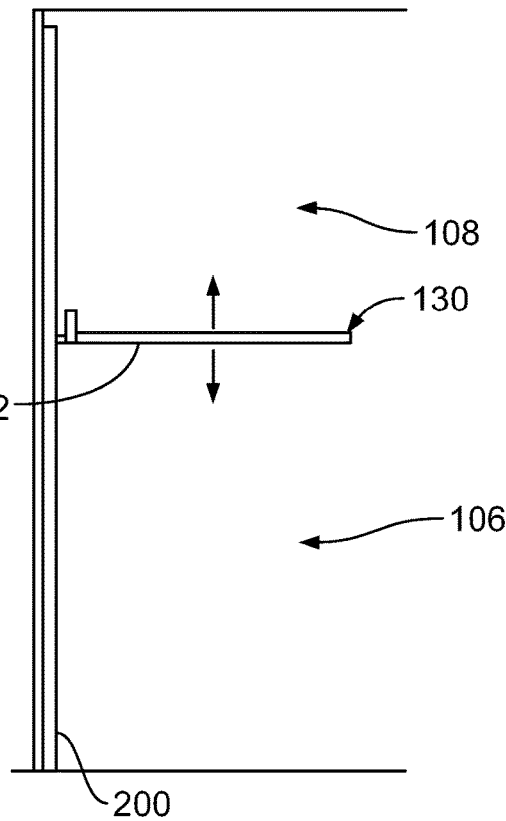
FIG. 5  FIG. 6
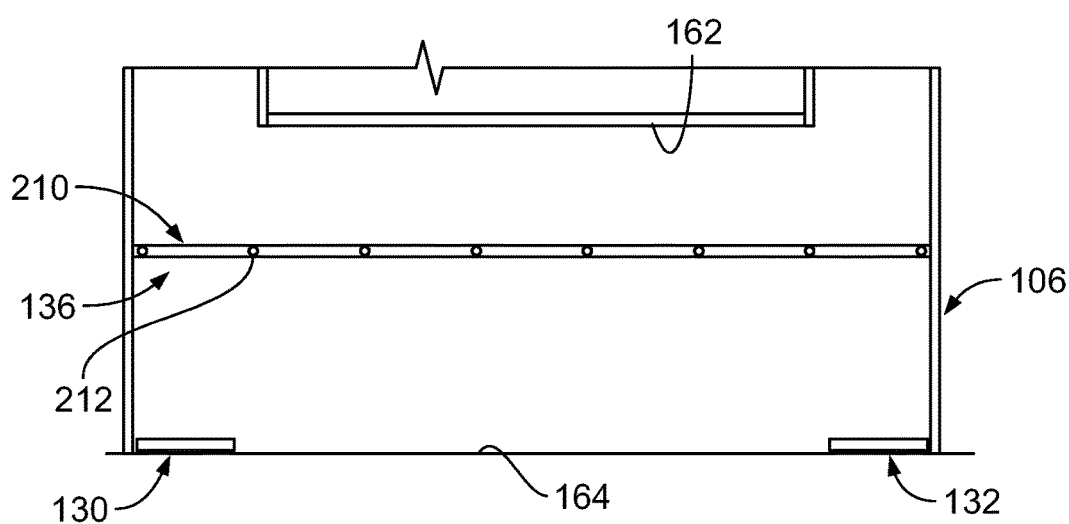
FIG. 7

GALLEY CART STOWAGE SYSTEM FOR A GALLEY OF AN AIRCRAFT

BACKGROUND

The present disclosure relates generally to systems and methods of stowing galley carts in a galley of an aircraft.

Commercial aircraft are typically fitted with galleys for storing and preparing food provided in meal services to passengers. Galleys include storage spaces for galley carts, which in turn contain food trays, beverages, and the like. For long-range flights in which two or three meals are served, large galleys are needed to accommodate the large number of galley carts needed to store the food and waste. These large galleys occupy a lot of space, and as a result, reduce the number of passenger seats that can be fitted on the passenger deck. This reduces the amount of revenue for the airline. Some known galley cart stowage systems provide galley cart stowage in the aircraft lower lobe or in the crown. However, such galley cart stowage systems typically use automated components that, upon failure, do not allow manual access to the lower storage area or the upper stowage area.

A need exists for a commercial aircraft galley arrangement in which a large number of galley carts may be stowed and accessed during flight without interfering with galley service.

SUMMARY

In accordance with one embodiment, a galley cart stowage system is provided for stowing galley carts in a galley of an aircraft. The galley cart stowage system includes a lower cart compartment defining a lower galley cart cavity configured to receive a plurality of the galley carts. The lower galley cart cavity is defined by a lower left side wall, a lower right side wall and a lower rear wall. The galley cart stowage system includes an upper cart compartment located above the lower cart compartment defining an upper galley cart cavity configured to receive a plurality of the galley carts. The upper galley cart cavity is defined by an upper left side wall, an upper right side wall and an upper rear wall. The galley cart stowage system includes a vertical conveyance device extending between the lower cart compartment and the upper cart compartment to move galley carts between the lower cart compartment and the upper cart compartment. The galley cart stowage system includes a galley workspace having a workspace volume located above the lower cart compartment and located below the upper cart compartment, the galley workspace having a countertop.

In accordance with one embodiment, an aircraft is provided including a cabin having a cabin floor and having a ceiling at a crown of the aircraft. The aircraft includes a galley within the cabin including a plurality of walls including a first side wall, a second side wall, and a rear wall extending between the first side wall and the second side wall opposite a front of the galley. The galley has a galley footprint between the first side wall, the second side wall, the rear wall and the front. The galley includes a galley cart stowage system for stowing galley carts. The galley cart stowage system includes a lower cart compartment within the galley footprint defining a lower galley cart cavity configured to receive a plurality of the galley carts. The lower galley cart cavity is defined by the first side wall, the second side wall and the rear wall, the lower cart compartment having lower doors at the front of the galley to close the lower galley cart cavity. The lower doors open to the cabin to provide access to the lower galley cart cavity from within the cabin. The lower cart compartment has a lower left end at the first side wall and a lower right end at the second side wall. The galley cart stowage system includes an upper cart compartment within the galley footprint defining an upper galley cart cavity configured to receive a plurality of the galley carts. The upper galley cart cavity is defined by the first side wall, the second side wall and the rear wall, the upper cart compartment having upper doors at the front of the galley to close the upper galley cart cavity. The upper doors open to the cabin to provide access to the upper galley cart cavity from within the cabin. The upper cart compartment has an upper left end at the first side wall and an upper right end at the second side wall. The galley cart stowage system includes a vertical conveyance device extending between the lower cart compartment and the upper cart compartment to move galley carts between the lower cart compartment and the upper cart compartment. The galley cart stowage system includes a galley workspace located above the lower cart compartment and located below the upper cart compartment. The galley workspace has a countertop and a workspace volume within the galley footprint.

In accordance with one embodiment, a method of stowing galley carts in a galley of an aircraft is provided including positioning a plurality of the galley carts in a lower galley cart cavity of a lower cart compartment below a countertop of a galley workspace between a lower left side wall and a lower right side wall forward of a lower rear wall and positioning a plurality of the galley carts in an upper galley cart cavity of an upper cart compartment above the galley workspace between an upper left side wall and an upper right side wall forward of an upper rear wall. The method includes moving the galley carts between the upper cart compartment and the lower cart compartment using a vertical conveyance device extending between the lower cart compartment and the upper cart compartment. The galley carts initially located in the upper cart compartment are moveable to the lower cart compartment to access such galley carts.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 2 is a front view of the galley in accordance with an exemplary embodiment showing a galley cart stowage system for stowing galley carts.

FIG. 3 is a side view of the galley in accordance with an exemplary embodiment.

FIG. 4 is a plan view of a lower portion of the galley in accordance with an exemplary embodiment.

FIG. 5 is a plan view of a lower portion of the galley in accordance with an exemplary embodiment.

FIG. 6 is a schematic view of a conveyance device of the galley cart stowage system in accordance with an exemplary embodiment.

FIG. 7 is a schematic view of a conveyance device of the galley cart stowage system in accordance with an exemplary embodiment.

DETAILED DESCRIPTION

Figure 1:
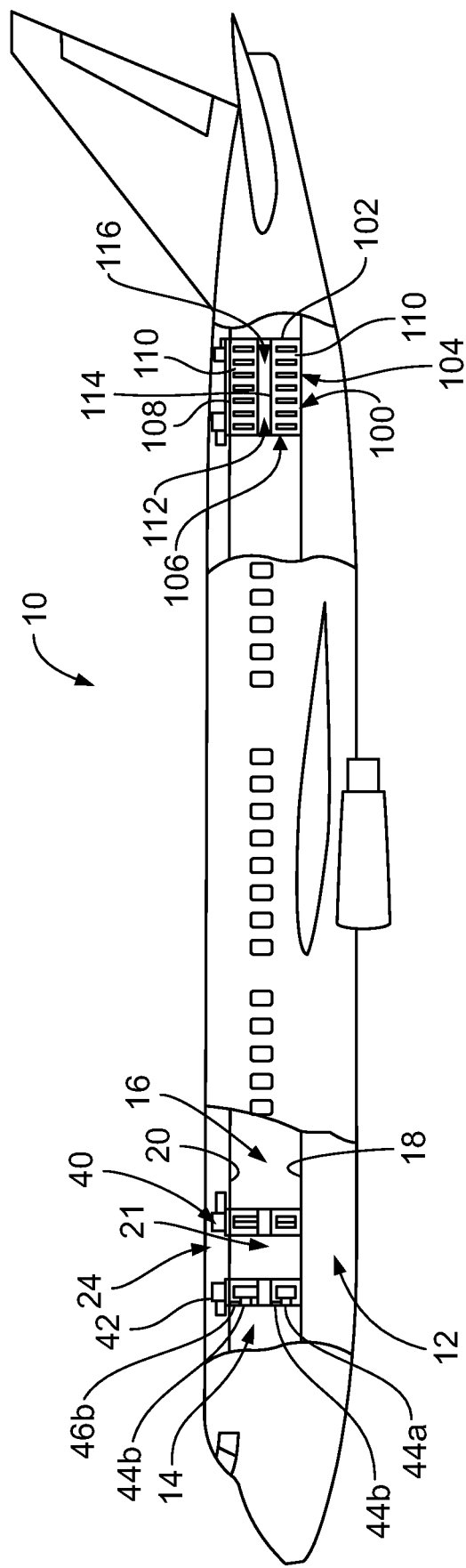
FIG. 1 is a cross-sectional schematic view of an aircraft in accordance with an exemplary embodiment including a galley.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley cart stowage system for stowing galley carts in a galley of an aircraft. The galley cart stowage system includes a galley workspace having a countertop and a workspace volume located above a lower cart compartment and located below an upper cart compartment. In various embodiments, the lower and upper cart compartments define lower and upper galley cart cavities that receive the galley carts such that the galley carts are located below the galley workspace and above the galley workspace. The lower galley cart compartment is defined by walls and have lower doors at a front that open to the galley to provide access to the cavity. The upper galley cart compartment is defined by walls and has upper doors at a front of the upper cart compartment that open to the galley to provide access to the cavity. In various embodiments, both the lower and the upper cart compartments are accessible by personnel from the galley space within the cabin of the aircraft. In various embodiments, one or more vertical conveyance devices extend between the lower and upper cart compartments to move galley carts therebetween. In various embodiments, lateral conveyance devices within the lower and upper cart compartments move the galley carts within the lower and upper cart compartments. In various embodiments, the galley carts are movable in a circuit encircling the galley workspace, such as a circuit extending above, below, on the right side and on the left side of the galley workspace. Stacking the cart compartments above and below the galley workspace increases the number of galley carts that may be stowed within a footprint of the galley space. As such, more cabin space may be available for passenger seating.

FIG. 1 is a cross-sectional schematic view of an aircraft 10 in accordance with an exemplary embodiment. The aircraft 10 includes a cargo area 12 within a lower portion of the aircraft 10. The cargo area 12 includes one or more cargo compartments. The aircraft 10 includes a cabin 14 defining a passenger area 16 above the cargo area 12. The cabin 14 includes a cabin floor 18 and a cabin ceiling 20. The cargo area 12 is separated from the passenger area 16 by the cabin floor 18. A crown 22 of the aircraft 10 defining an overhead area 24 is separated from the passenger area 16 by the cabin ceiling 20.

The aircraft 10 includes one or more galleys 100 in the cabin 14 (shown in cross section). Each galley 100 is accessible by personnel from within the passenger area 16, such as from a galley space 26 within the passenger area 16. The galley 100 is a catering area accessible by the crew of the aircraft 10 for stowing items used to serve the passengers, such as food items, beverage items, and the like. The galley 100 includes a plurality of walls 102 extending between the cabin floor 18 and the cabin ceiling 20. The galley 100 includes a galley cart stowage system 104 for stowing galley carts 110 in the galley 100. The walls 102 define cart compartments, such as a lower cart compartment 106 and an upper cart compartment 108 for stowing the galley carts 110. In various examples, the galley 100 may be forward facing or aft facing in the aircraft 10. In other various embodiments, the galley 100 may be arranged longitudinally within the aircraft 10 such that the galley 100 faces the right side of the aircraft 10 or the left side of the aircraft 10.

The walls 102 define a galley workspace 112 usable by the crew to prepare meals and use for food and beverage service. The galley workspace 112 includes a countertop 114 and a workspace volume 116 above the countertop 114 defining the working space for the crew. In an exemplary embodiment, the cart compartments 106 are stacked to stow the galley carts 110 both below and above the galley workspace 112. The galley carts 110 are accessible from the galley space 26. For example, the galley carts 110 above the galley workspace 112 are accessible from the galley space 26 by crew members. The crew members may stand on a stepstool, an elevatable floor panel, a standing platform that may be winched or otherwise lifted upward to access the upper galley carts 110. Space dedicated to the galley 100 is unusable for passenger seats or other purposes such as lavatories, and thus it may be desirable for aircraft manufacturers to reduce the footprint of the galley 100 in order to increase the seating area of the passenger area 16 to increase revenue of each flight for aircraft operators. Stacking the cart compartments 106 to include stowage for the galley carts 110 above the galley workspace allows an increased number of galley carts 110 within the given galley footprint (for example, compared to unstacked galleys).

The galley 100 includes a galley cooling system 40 that provides cooled airflow for the galley 100. In various embodiments, components of the galley cooling system 40 are positioned above the galley 100 (e.g., in the crown 22 of the aircraft 10) above the cabin ceiling 20. In alternative embodiments, components of the galley cooling system 40 are positioned in the galley 100. In other alternative embodiments, components of the galley cooling system 40 are positioned below the galley 100 (e.g., in the cargo area 12 of the aircraft 10 below the cabin floor 18). In an exemplary embodiment, the galley cooling system 40 includes a heat exchanger 42 producing the cooled airflow. In various embodiments, the heat exchanger 42 is a chiller including a compressor, a condenser, an evaporator and an air handler to produce the cooled airflow. The galley cooling system 40 includes supply ducts 44 and return ducts 46 that circulate airflow through the cart compartments 106. In an exemplary embodiment, the supply ducts 44 include lower supply ducts 44a extending to the lower cart compartment 106 and upper supply ducts 44b extending to the upper cart compartment 108. The return ducts 46 include lower return ducts 46a extending to the lower cart compartment 106 and upper return ducts 46b extending to the upper cart compartment 108.

FIG. 2 is a front view of the galley 100 in accordance with an exemplary embodiment showing the galley cart stowage system 104 for stowing the galley carts 110. FIG. 3 is a side view of the galley 100 in accordance with an exemplary embodiment showing the galley cart stowage system 104 for stowing the galley carts 110. FIG. 4 is a plan view of a lower portion of the galley 100 in accordance with an exemplary embodiment showing the galley cart stowage system 104 for stowing the galley carts 110. FIG. 5 is a plan view of a lower portion of the galley 100 in accordance with an exemplary embodiment showing the galley cart stowage system 104 for stowing the galley carts 110.

The walls 102 of the galley 100 extend between the cabin floor 18 and the cabin ceiling 20. The walls 102 include a first side wall 120 (FIG. 2) at a left side of the galley 100 and a second side wall 122 (FIG. 2) at a right side of the galley 100. The walls 102 includes a rear wall 124 (FIG. 3) at a rear of the galley 100. The first and second side walls 120, 122 extend from the rear wall 124 to a front 126 of the galley 100. The galley 100 has a footprint 128 on the cabin floor 18. The footprint 128 occupies a surface area of the cabin floor 18 defined by the side walls 120, 122, the rear wall 124 and the front 126. The lower cart compartment 106 is contained within the footprint 128. The upper cart compartment 108 is contained within the footprint 128. The galley workspace 112 is contained within the footprint 128. In various examples, the galley 100 may be arranged in the aircraft 10 such that the front 126 of the galley 100 faces the aft end of the aircraft 10. In other various embodiments, the galley 100 may be arranged in the aircraft 10 such that the front 126 of the galley 100 faces the forward end of the aircraft 10. In other various embodiments, the galley 100 may be arranged longitudinally within the aircraft 10 such that the front 126 of the galley 100 faces the right side of the aircraft 10 or facing the left side of the aircraft 10.

The galley cart stowage system 104 includes the lower cart compartment 106 and the upper cart compartment 108 with the galley workspace 112 between the lower cart compartment 106 and the upper cart compartment 108. The galley cart stowage system 104 includes one or more vertical conveyance devices, such as a left vertical conveyance device 130 and a right vertical conveyance device 132. The vertical conveyance devices 130, 132 extend between the lower cart compartment 106 and the upper cart compartment 108 to move the galley carts 110 between the lower cart compartment 106 and the upper cart compartment 108. The vertical conveyance devices 130, 132 may be adjacent the galley workspace 112, such as flanking opposite left and right sides of the galley workspace 112. The left vertical conveyance device 130 is at the first side wall 120. The right vertical conveyance device 132 is at the second side wall 122. The galley workspace 112 is located between the vertical conveyance devices 130, 132. The vertical conveyance device(s) may be at other locations in alternative embodiments. In an alternative embodiment, the galley cart stowage system 104 includes a single vertical conveyance device, such as at the first side wall 120, the second side wall 122 or at another location, such as centered between the first and second side walls 120, 122. The vertical conveyance device may include an elevator, a lift, a jacking system, and the like.

In an exemplary embodiment, the galley cart stowage system 104 includes one or more lateral conveyance devices, such as a lower lateral conveyance device 136 and an upper lateral conveyance device 138. The lower lateral conveyance device 136 is located in the lower cart compartment 106 and moves the galley carts 110 laterally (for example, side-to-side) within the lower cart compartment 106. The lower lateral conveyance device 136 moves the galley carts 110 between the left and right vertical conveyance devices 130, 132. The upper lateral conveyance device 138 is located in the upper cart compartment 108 and moves the galley carts 110 laterally within the upper cart compartment 108. The upper lateral conveyance device 138 moves the galley carts 110 between the left and right vertical conveyance devices 130, 132. In various examples, the lateral conveyance device 138 may include a translating mover plate that engages and pushes the galley cart 110 on its own wheels. In other various examples, the lateral conveyance device 138 includes a supporting tray supporting the galley cart 110 (for example, the wheels resting on the supporting tray). The supporting tray may be translated by a ballscrew mechanism, a linear actuator, a belt, a roller tray with powered rollers, or other mechanical conveyance system.

In an exemplary embodiment, the galley cart stowage system 104 is configured to move the galley carts 110 in a circuit 140, such as in a counter-clockwise direction, encircling the galley workspace 112. For example, the lower lateral conveyance device 136 moves the galley carts 110 in the lower cart compartment 106 from the left side to the right side. The lower lateral conveyance device 136 moves the galley carts 110 in the lower cart compartment 106 to the right vertical conveyance device 132. The right vertical conveyance device 132 moves the galley carts 110 to the upper cart compartment 108. The upper lateral conveyance device 138 moves the galley carts 110 in the upper cart compartment 108 to the left vertical conveyance device 130. The left vertical conveyance device 130 moves the galley carts 110 to the lower cart compartment 106. In an alternative embodiment, the galley cart stowage system 104 is configured to move the galley carts 110 in a clockwise direction around the circuit 140. In various examples, a closed-circuit conveyor system is used to perform both the vertical and lateral movements of carts around the circuit.

The lower cart compartment 106 defining a lower galley cart cavity 150 configured to receive a plurality of the galley carts 110. In the illustrated embodiment, the lower galley cart cavity 150 holds seven galley carts 110; however the lower galley cart cavity 150 may be sized to hold greater or fewer galley carts 110. The lower galley cart cavity 150 is defined by a lower left side wall 152, a lower right side wall 154, and a lower rear wall 156 between the lower left and right side walls 152, 154. The lower rear wall 156 may be defined by the rear wall 124. The lower left side wall 152 may be defined by the first side wall 120. The lower right side wall 154 may be defined by the second side wall 122. In an exemplary example, the lower cart compartment 106 includes optional lower doors 158 at a front 160 of the lower cart compartment 106 to close the lower galley cart cavity 150. The lower doors 158 open to the galley space 26 in front of the galley 100 to provide access to the lower galley cart cavity 150, such as to remove the galley carts 110. The lower cart compartment 106 extends between a top 162 and a bottom 164. The countertop 114 is provided at the top 162. The bottom 164 is provided at the cabin floor 18 and contained within the footprint 128 of the galley 100.

The upper cart compartment 108 defining an upper galley cart cavity 170 configured to receive a plurality of the galley carts 110. In the illustrated embodiment, the upper galley cart cavity 170 holds seven galley carts 110; however the upper galley cart cavity 170 may be sized to hold greater or fewer galley carts 110. The upper galley cart cavity 170 is defined by an upper left side wall 172, an upper right side wall 174, and an upper rear wall 176 between the upper left and right side walls 172, 174. The upper rear wall 176 may be defined by the rear wall 124. The upper left side wall 172 may be defined by the first side wall 120. The upper right side wall 174 may be defined by the second side wall 122. In an exemplary embodiment, the upper cart compartment 108 includes optional upper doors 178 at a front 180 of the upper cart compartment 108 to close the upper galley cart cavity 170. The upper doors 178 are located immediately above the galley workspace 112. The upper doors 178 open to the galley space 26 in front of the galley 100 to provide access to the upper galley cart cavity 170. The upper galley carts 110 are accessible from the galley space 26 by crew members, such as by standing on a step-stool, an elevatable floor panel, a standing platform that may be winched or otherwise lifted upward to access the upper galley carts 110. In an exemplary embodiment, the galley workspace 112 is of sufficiently small height such that a median stature crew member standing on a two-step stepladder can reach and access a highest location food tray of the upper galley cart 110 in the upper galley cart cavity 170. For example, the galley workspace 112 may be between 0.3 meters and 0.5 meters (12"-20") such that the upper cart compartment 108 is low enough that it may be easily accessible by the crew member. In various embodiments, the top of the upper galley cart cavity 170 is not more than 2.6 meters (8.5') above the floor of the galley 100. Optionally, the top of the upper galley cart cavity 170 is at approximately 2.4 meters (8.0'). The upper galley cart cavity 170, and the upper galley carts 110 in the upper galley cart cavity 170, are positioned within the galley 100 at a height allowing access to the top of the upper galley cart cavity 170 by a crew member, such as with the crew member standing on a two-step ladder. As such, the crew member has backup access to the meal trays and drinks in the upper galley carts 110 in case of failure of the conveyance system during flight. The top of the galley cart 110 is accessible by having a small elevation, such as by a stepstool or elevatable platform or floor panel, going up a small distance, such as 1 to 2 feet, in the aisleway standing area in front of the galley 100.

In an exemplary embodiment, the upper cart compartment 108 shares a footprint with the lower cart compartment 106. The upper cart compartment 108 extends between a top 182 and a bottom 184. The galley workspace 112 is located below the bottom 184. The top 182 is provided at the cabin ceiling 20. As such, the upper doors 178 are contained within and accessible within the cabin 14, such as to access the galley carts 110. For example, in the situation of a malfunction of the conveyance devices 130, 132, 136, 138, the upper doors 178 are opened to retrieve the contents of the galley carts 110.

In an exemplary embodiment, the galley cart stowage system 104 includes vertical connecting chambers 190 between the lower galley cart cavity 150 and the upper galley cart cavity 170. The vertical conveyance devices 130, 132 are located within the vertical connecting chambers 190 to move the galley carts 110 within the vertical connecting chambers 190 between the lower galley cart cavity 150 and the upper galley cart cavity 170. The vertical connecting chambers 190 are defined by the walls 102 of the galley 100, such as the side walls 120, 122 and chamber walls 192. The chamber walls 192 extend between the vertical connecting chambers 190 and the galley workspace 112.

FIG. 6 is a schematic view of the left vertical conveyance device 130 in accordance with an exemplary embodiment. The right vertical conveyance device 132 (shown in FIG. 2) may be similar to the left vertical conveyance device 130. The vertical conveyance device 130 includes a lift for lifting or lowering the galley carts 110 (shown in FIG. 5) between the cart compartments 106, 108.

In an exemplary embodiment, the vertical conveyance device 130 includes a track 200 and one or more actuated engagement devices 202 movable along the track 200. The track 200 extends vertically. The actuated engagement device 202 is configured to engage the galley carts 110 (shown in FIG. 5) to move the galley carts 110 between the lower cart compartment 106 and the upper cart compartment 108. In various embodiments, the track 200 includes one or more rails for supporting the actuated engagement device 202. In other various embodiments, the track 200 may include a chain, a belt, a pulley and the like. The actuated engagement device 202 may include a plate, a rod, a pin, a bracket or another supporting structure configured to engage the galley cart 110 to lift the galley cart 110.

FIG. 7 is a schematic view of the lower lateral conveyance device 136 in accordance with an exemplary embodiment. The upper lateral conveyance device 138 (shown in FIG. 2) may be similar to the lower lateral conveyance device 136. The lateral conveyance device 136 includes a conveyor for shifting the galley carts 110 (shown in FIG. 5) side-to-side in the lower cart compartment 106.

In an exemplary embodiment, the lateral conveyance device 136 includes a track 210 and one or more actuated engagement devices 212 movable along the track 210. The track 210 extends horizontally. The track 210 may be provided at the bottom 164 of the cart compartment 106 such that the actuated engagement device 212 engages the bottom of the galley cart 110. The track 210 may be provided at the top 162 of the cart compartment such that the actuated engagement device 212 engages the top of the galley cart 110. In other various embodiments, the track 210 may be provided in the rear wall 156 to engage the rear of the galley cart 110. The actuated engagement device 202 moves the galley carts 110 between the left and right vertical conveyance devices 130, 132 (both shown in FIG. 2). In various embodiments, the track 210 includes one or more rails for supporting the actuated engagement device 212. In other various embodiments, the track 210 may include a chain, a belt, a pulley and the like. The actuated engagement device 212 may include a plate, a rod, a pin, a bracket or another supporting structure configured to engage the galley cart 110 to push the galley cart 110.

Figure 8:
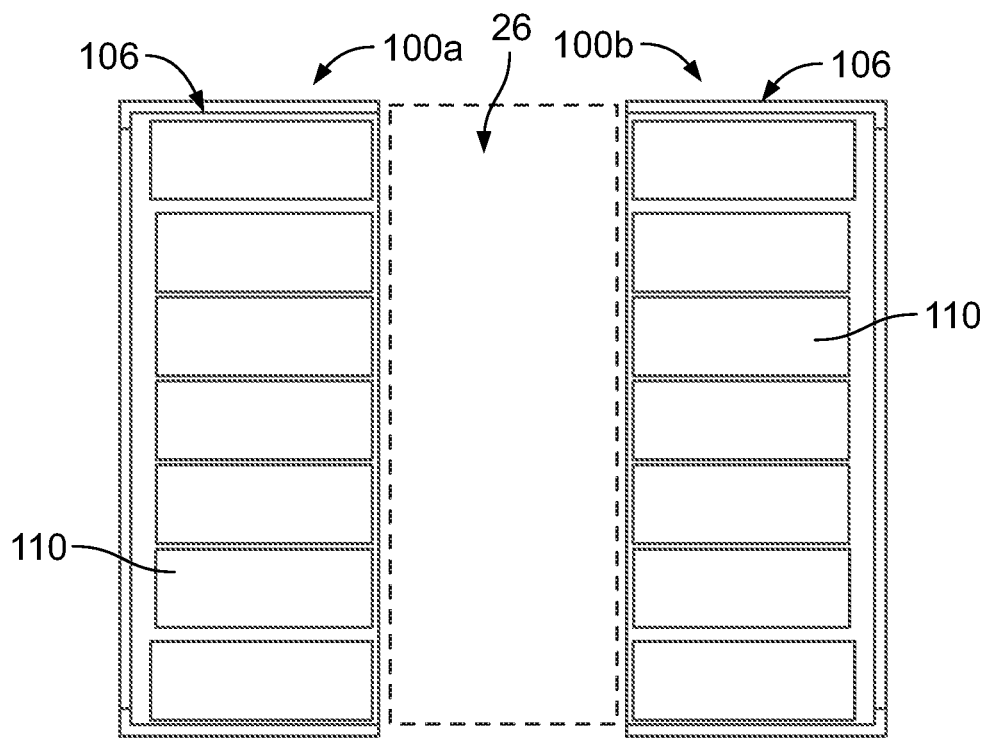
FIG. 8 is a plan view of a portion of the aircraft showing galleys in accordance with an exemplary embodiment.
Figure 9:
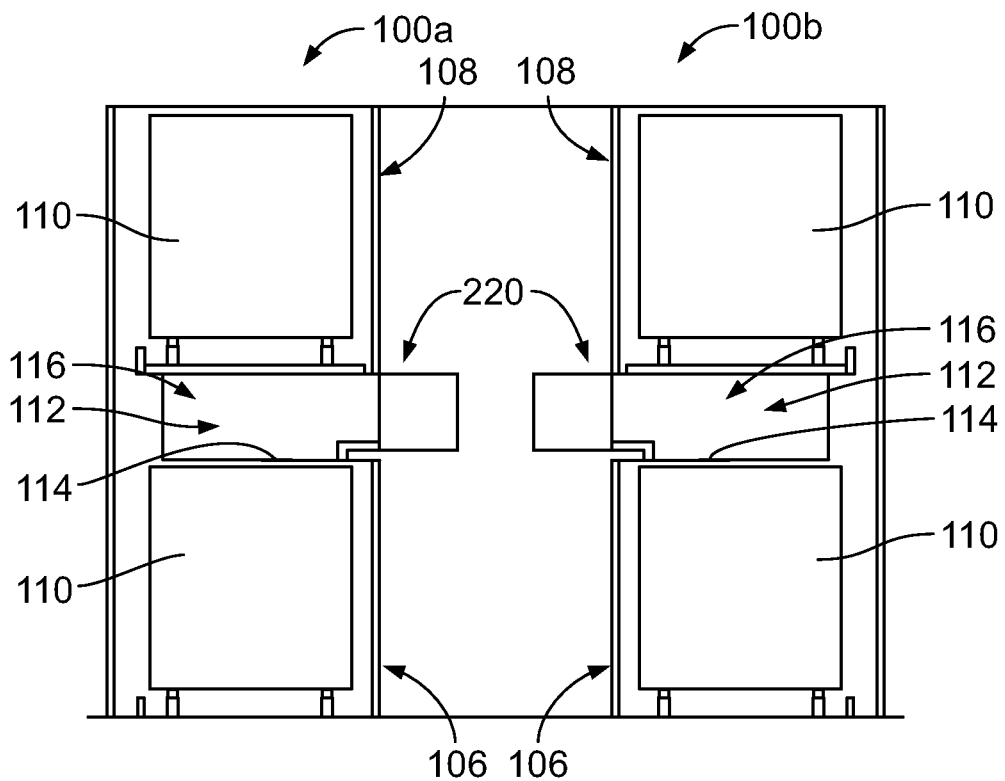
FIG. 9 is a side view of a portion of the aircraft showing the galleys in accordance with an exemplary embodiment.

FIG. 8 is a plan view of a portion of the aircraft 10 showing a forward galley 100a and a rearward galley 100b facing each other across the galley space 26. FIG. 9 is a side view of a portion of the aircraft 10 showing the forward galley 100a and the rearward galley 100b in accordance with an exemplary embodiment. The galleys 100a, 100b may be similar to each other and oriented 180° relative to each other on opposite sides of the galley space 26. The galleys 100a, 100b include the lower and upper cart compartments 106, 108 holding galley carts 110 below and above the galley workspaces 112. Both of the galleys 100a, 100b include countertops 114 as work areas for use during food and beverage service.

In an exemplary embodiment, the galleys 100a, 100b include galley equipment 220 that is storable in the workspace volume 116 and removable from the workspace volume 116 to access the galley equipment 220 and access the countertop 114. For example, the galley equipment 220 may be rotatable into and out of the workspace volume 116. The galley equipment 220 may be a coffee maker, a microwave oven or other equipment used for food and beverage service.

Figure 10:
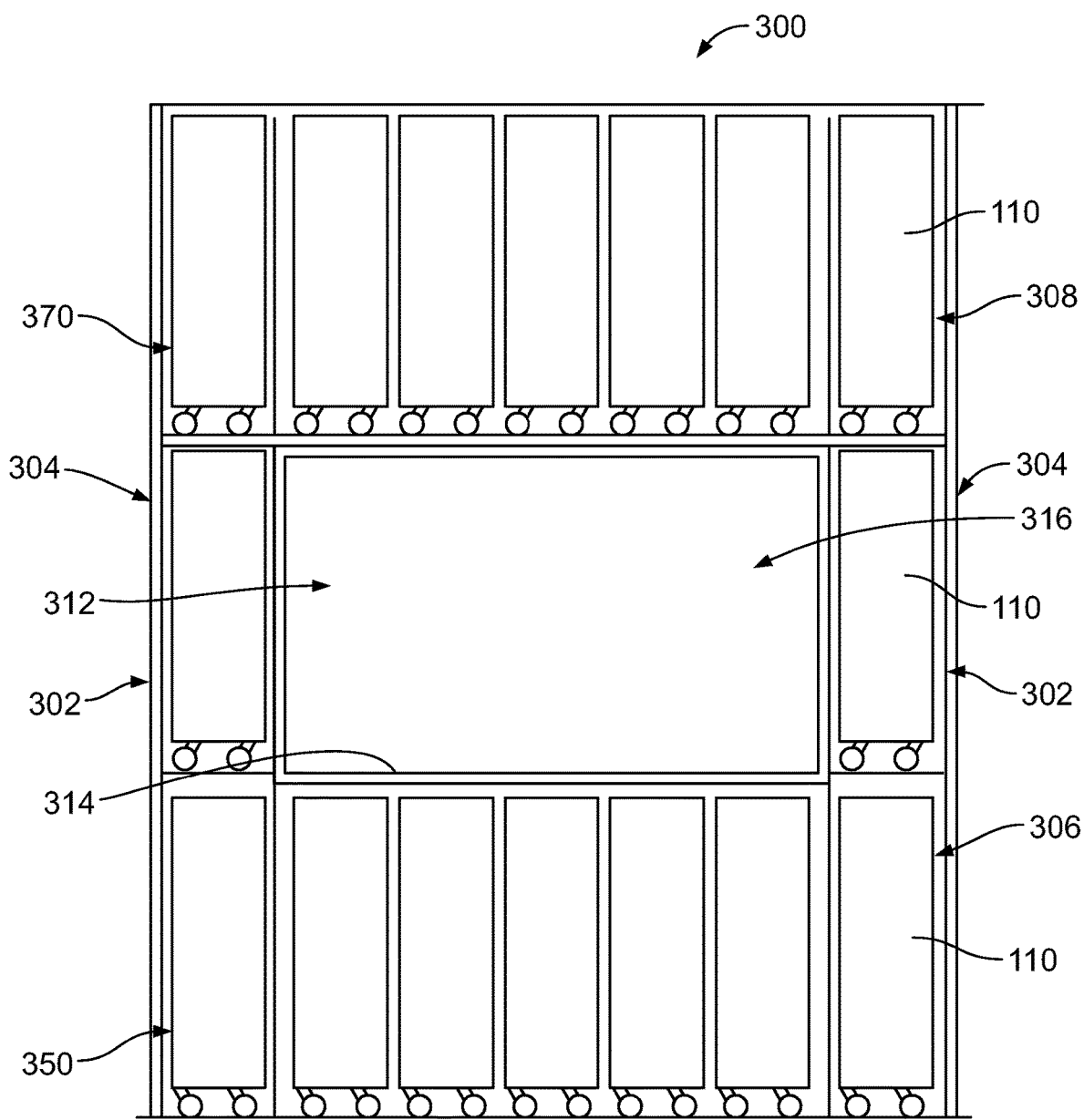
FIG. 10 is a front view of a galley in accordance with an exemplary embodiment.

FIG. 10 is a front view of a galley 300 in accordance with an exemplary embodiment. The galley 300 is similar to the galley 100 (shown in FIG. 2) and includes similar features and components. The galley 300 includes mid-level cart compartments 302 located between a lower cart compartment 306 and an upper cart compartment 308. The mid-level cart compartments 302 are provided at left and right sides of the galley 300. The mid-level cart compartments 302 house galley carts 110. The mid-level cart compartments 302 are located on opposite sides of a galley workspace 312. The mid-level cart compartments 302 allow stowage of galley carts 110 between galley carts 110 held in the lower and upper cart compartments 306, 308. The mid-level cart compartments 302 allow stowage of two additional galley carts 110 compared to the embodiment of the galley 100 illustrated in FIG. 2.

The mid-level cart compartment 302 includes a vertical connecting chamber 304 open to a lower galley cart cavity 350 and an upper galley cart cavity 370. The vertical connecting chamber 304 receives the galley carts 110 as the galley carts 110 transition between the lower cart compartment 306 and the upper cart compartment 308. The mid-level cart compartment 302 has a door (not shown, removed to illustrate the galley carts 110) at a front of the mid-level cart compartment 302 to close the vertical connecting chamber 304. The door 320 opens to the galley space 26 to provide access to the vertical connecting chamber 304. In an exemplary embodiment, a workspace volume 316 of the galley workspace 312 is enlarged (for example, taller) compared to the workspace volume 116 (shown in FIG. 2). The upper cart compartment 308 is elevated is shifted upward compared to the positioning of the upper cart compartment 108 (shown in FIG. 2) to provide the additional workspace volume 316. In an exemplary embodiment, the workspace volume 316 has a height approximately equal to a height of the galley cart 110.

Figure 11:
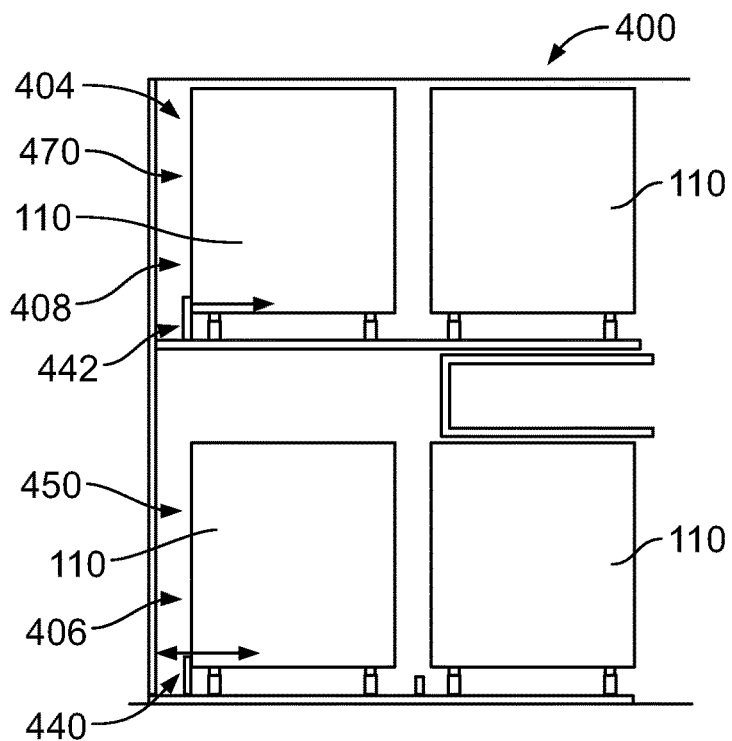
FIG. 11 is a side view of a galley in accordance with an exemplary embodiment.

FIG. 11 is a side view of a galley 400 in accordance with an exemplary embodiment. The galley 400 is similar to the galley 100 (shown in FIG. 2) and includes similar features and components. The galley 400 includes a galley cart stowage system 404. The galley 400 includes double depth cart compartments including a lower cart compartment 406 and an upper cart compartment 408. The lower cart compartment 406 includes a double depth cavity 450 holding galley carts 110 in two rows. The upper cart compartment 408 includes a double depth cavity 470 holding galley carts 110 in two rows. The cart compartments 406, 408 allow stowage of twice the number of galley carts 110 compared to the embodiment of the galley 100 illustrated in FIG. 2.

The galley cart stowage system 404 includes a lower longitudinal conveyance device 440 configured to move the galley carts 110 longitudinally between the two rows within the lower galley cart cavity 450. The galley cart stowage system 404 includes an upper longitudinal conveyance device 442 configured to move the galley carts 110 longitudinally between the two rows within the upper galley cart cavity 470. The longitudinal conveyance devices 440, 442 may include tracks and actuators movable along the track to move the galley carts 110.

Figure 12:
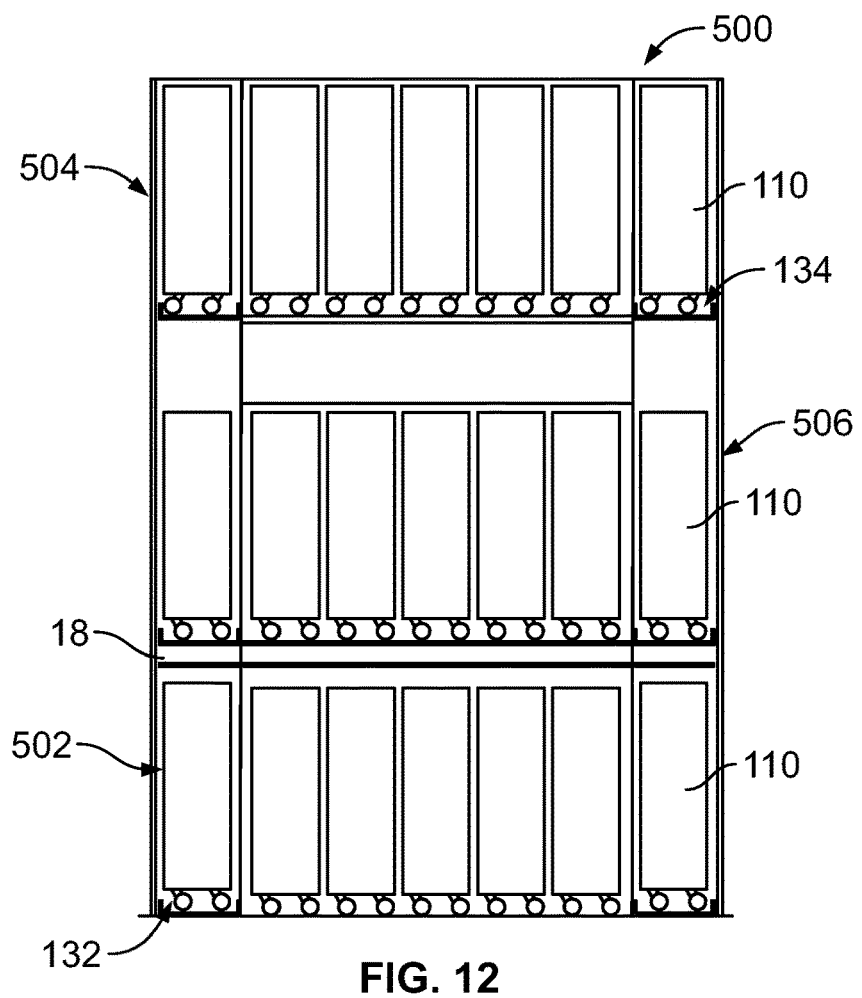
FIG. 12 is a front view of a galley in accordance with an exemplary embodiment.

FIG. 12 is a front view of a galley 500 in accordance with an exemplary embodiment. The galley 500 is similar to the galley 100 (shown in FIG. 2) and includes similar features and components. The galley 500 includes a galley cart stowage system 504. The galley 500 includes an under-deck cart compartment 502 located below the cabin floor 18. The under-deck cart compartment 502 holds galley carts 110 outside of the cabin 14. The under-deck cart compartment 502 is inaccessible from the galley space 26. However, the under-deck cart compartment 502 allows stowage of additional galley carts 110 compared to the embodiment of the galley 100 illustrated in FIG. 2. In an exemplary embodiment, the vertical conveyance devices 130, 132 extending between a lower cart compartment 506 and the under-deck cart compartment 502 to move the galley carts 110 between the lower cart compartment 506 and the under-deck cart compartment 502.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley cart stowage system for stowing galley carts in a galley of an aircraft, the galley cart stowage system comprising:
    a lower cart compartment defining a lower galley cart cavity configured to receive a plurality of the galley carts, the lower galley cart cavity defined by a lower left side wall, a lower right side wall and a lower rear wall;
    an upper cart compartment located above the lower cart compartment, the upper cart compartment defining an upper galley cart cavity configured to receive a plurality of the galley carts, the upper galley cart cavity defined by an upper left side wall, an upper right side wall and an upper rear wall, wherein the upper cart compartment includes upper doors at a front of the upper cart compartment to close the upper galley cart cavity, the upper doors opening to the galley to provide access to the upper galley cart cavity from the galley;
    a vertical conveyance device extending between the lower cart compartment and the upper cart compartment to move the galley carts between the lower cart compartment and the upper cart compartment; and a galley workspace having a workspace volume located above the lower cart compartment and located below the upper cart compartment, the galley workspace having a countertop.

2. The galley cart stowage system of claim 1, wherein the vertical conveyance device is adjacent the galley workspace to move the galley carts from the lower cart compartment below the galley workspace to the upper cart compartment above the galley workspace.

3. The galley cart stowage system of claim 1, wherein the upper cart compartment shares a footprint with the lower cart compartment in the galley, the galley workspace contained within the footprint of the lower cart compartment and the upper cart compartment.

4. The galley cart stowage system of claim 1, wherein the upper cart compartment includes upper doors located immediately above the galley workspace.

5. The galley cart stowage system of claim 1, wherein the vertical conveyance device is a left vertical conveyance device, the galley cart stowage system further comprising a right vertical conveyance device extending between the lower cart compartment and the upper cart compartment to move the galley carts between the lower cart compartment and the upper cart compartment, the galley workspace being positioned between the left vertical conveyance device and the right vertical conveyance device.

6. The galley cart stowage system of claim 5, further comprising:
   a lower lateral conveyance device in the lower cart compartment between the lower left side wall and the lower right side wall, the lower lateral conveyance device moving the galley carts laterally within the lower galley cart cavity between the left vertical conveyance device and the right vertical conveyance device; and
   an upper lateral conveyance device in the upper cart compartment between the upper left side wall and the upper right side wall, the upper lateral conveyance device moving the galley carts laterally within the upper galley cart cavity between the left vertical conveyance device and the right vertical conveyance device.

7. The galley cart stowage system of claim 6, wherein the left vertical conveyance device, the right vertical conveyance device, the lower lateral conveyance device, and the upper lateral conveyance device cooperate to move the galley carts in a circuit encircling the galley workspace.

8. The galley cart stowage system of claim 1, wherein the vertical conveyance device includes a track and an actuated engagement device movable along the track, the actuated engagement device engaging the galley carts to move the galley carts between the lower cart compartment and the upper cart compartment.

9. The galley cart stowage system of claim 1, further comprising a vertical connecting chamber between the lower galley cart cavity and the upper galley cart cavity, the vertical conveyance device located within the vertical connecting chamber to move the galley carts within the vertical connecting chamber between the lower galley cart cavity and the upper galley cart cavity.

10. The galley cart stowage system of claim 1, further comprising a mid-level cart compartment located between the lower cart compartment and the upper cart compartment, the mid-level cart compartment having a vertical connecting chamber open to the lower galley cart cavity and the upper galley cart cavity, the vertical connecting chamber configured to receive the galley carts as the galley carts transition between the lower cart compartment and the upper cart compartment.

11. The galley cart stowage system of claim 1, wherein the lower galley cart cavity is a double depth cavity configured to receive two rows of the galley carts between the lower rear wall and lower doors, the galley cart stowage system further comprising a lower longitudinal conveyance device configured to move the galley carts longitudinally between the two rows within the lower galley cart cavity, and wherein the upper galley cart cavity is a double depth cavity configured to receive two rows of the galley carts between the upper rear wall and upper doors, the galley cart stowage system further comprising an upper longitudinal conveyance device configured to move the galley carts longitudinally between the two rows within the upper galley cart cavity.

12. The galley cart stowage system of claim 1, wherein the lower cart compartment includes lower doors at a front of the lower cart compartment to close the lower galley cart cavity, the lower doors opening to the galley to provide access to the lower galley cart cavity.

13. The galley cart stowage system of claim 1, wherein the upper galley cart cavity is positioned within the galley at a height allowing access to a top of the upper galley cart cavity by a crew member from within a cabin of the aircraft.

14. The galley cart stowage system of claim 1, wherein an upper portion of the upper galley cart cavity is accessible from within the galley by opening the upper doors.

15. An aircraft comprising:
   a cabin having a cabin floor, the cabin having a cabin ceiling at a crown of the aircraft; and
   a galley within the cabin, the galley including a plurality of walls including a first side wall, a second side wall, and a rear wall extending between the first side wall and the second side wall opposite a front of the galley, the galley having a galley footprint between the first side wall, the second side wall, the rear wall and the front, the galley including a galley cart stowage system for stowing galley carts, the galley cart stowage system comprising:
   a lower cart compartment within the galley footprint defining a lower galley cart cavity configured to receive a plurality of the galley carts, the lower galley cart cavity defined by the first side wall, the second side wall and the rear wall, the lower cart compartment having lower doors at the front of the galley to close the lower galley cart cavity, the lower doors opening to the cabin to provide access to the lower galley cart cavity from within the cabin, the lower cart compartment having a lower left end at the first side wall, the lower cart compartment having a lower right end at the second side wall;
   an upper cart compartment within the galley footprint defining an upper galley cart cavity configured to receive a plurality of the galley carts, the upper galley cart cavity defined by the first side wall, the second side wall and the rear wall, the upper cart compartment having upper doors at the front of the galley to close the upper galley cart cavity, the upper doors opening to the cabin to provide access to the upper galley cart cavity from within the cabin, the upper cart compartment having an upper left end at the first side wall, the upper cart compartment having an upper right end at the second side wall;
   a vertical conveyance device extending between the lower cart compartment and the upper cart compartment to move the galley carts between the lower cart compartment and the upper cart compartment; and a galley workspace located above the lower cart compartment and located below the upper cart compartment, the galley workspace having a countertop and a workspace volume within the galley footprint.

16. The aircraft of claim 15, further comprising a galley cooling system having a heat exchanger producing a cooled airflow, the galley cooling system including a lower supply duct extending between the heat exchanger and the lower cart compartment, a lower return duct extending between the heat exchanger and the lower cart compartment, an upper supply duct extending between the heat exchanger and the upper cart compartment, and an upper return duct extending between the heat exchanger and the upper cart compartment.

17. The aircraft of claim 15, further comprising galley equipment removably received within the workspace volume of the galley workspace.

18. The aircraft of claim 15, further comprising an under-deck cart compartment located below the cabin floor, the vertical conveyance device extending between the lower cart compartment and the under-deck cart compartment to move the galley carts between the lower cart compartment and the under-deck cart compartment.

19. The aircraft of claim 15, wherein the vertical conveyance device is a left vertical conveyance device, the galley cart stowage system further comprising a right vertical conveyance device extending between the lower cart compartment and the upper cart compartment to move the galley carts between the lower cart compartment and the upper cart compartment, the galley workspace being positioned between the left vertical conveyance device and the right vertical conveyance device.

20. The aircraft of claim 19, further comprising:

a lower lateral conveyance device in the lower cart compartment between the lower left end and the lower right end, the lower lateral conveyance device moving the galley carts laterally within the lower galley cart cavity between the left vertical conveyance device and the right vertical conveyance device; and an upper lateral conveyance device in the upper cart compartment between the upper left end and the upper right end, the upper lateral conveyance device moving the galley carts laterally within the upper galley cart cavity between the left vertical conveyance device and the right vertical conveyance device.

21. The aircraft of claim 20, wherein the left vertical conveyance device, the right vertical conveyance device, the lower lateral conveyance device, and the upper lateral conveyance device cooperate to move the galley carts in a circuit encircling the galley workspace.

22. The aircraft of claim 15, wherein the vertical conveyance device includes a track and an actuated engagement device movable along the track, the actuated engagement device engaging the galley carts to move the galley carts between the lower cart compartment and the upper cart compartment.

23. The aircraft of claim 15, wherein the upper galley cart cavity is positioned within the galley at a height such that a top of the upper galley cart cavity is accessible by a crew member from within a cabin of the aircraft by opening the upper doors.

24. A method of stowing galley carts in a galley of an aircraft, the method comprising:

positioning a plurality of the galley carts in a lower galley cart cavity of a lower cart compartment below a countertop of a galley workspace between a lower left side wall and a lower right side wall forward of a lower rear wall;

positioning a plurality of the galley carts in an upper galley cart cavity of an upper cart compartment above the galley workspace between an upper left side wall and an upper right side wall forward of an upper rear wall, wherein the upper cart compartment includes upper doors at a front of the upper cart compartment to close the upper galley cart cavity, the upper doors opening to the galley to provide access to the upper galley cart cavity from the galley; and moving the galley carts between the upper cart compartment and the lower cart compartment using a vertical conveyance device extending between the lower cart compartment and the upper cart compartment, wherein the galley carts initially located in the upper cart compartment are moveable to the lower cart compartment to access such galley carts.

25. The method of claim 24, further comprising accessing at least one of food and beverage items in the galley carts in the upper galley cart cavity from within the galley.

26. The method of claim 24, further comprising opening the upper doors of the upper cart compartment to access the galley carts in the upper galley cart cavity.

* * * * *